(12) United States Patent
Franich

(10) Patent No.: US 10,472,089 B2
(45) Date of Patent: Nov. 12, 2019

(54) DUAL MODE AFT LIGHT WITH A FIRST LIGHT EMITTER AND A PLURALITY OF SECOND LIGHT EMITTERS

(71) Applicant: Goodrich Lighting Systems, Inc., Oldsmar, FL (US)

(72) Inventor: David Franich, Tempe, AZ (US)

(73) Assignee: GOODRICH LIGHTING SYSTEMS, INC., Oldsmar, FL (US)

( * ) Notice: Subject to any disclaimer, the term of this patent is extended or adjusted under 35 U.S.C. 154(b) by 402 days.

(21) Appl. No.: 15/057,706

(22) Filed: Mar. 1, 2016

(65) Prior Publication Data
US 2017/0253347 A1    Sep. 7, 2017

(51) Int. Cl.
*B64D 47/06*    (2006.01)
*F21V 11/16*    (2006.01)

(52) U.S. Cl.
CPC .............. *B64D 47/06* (2013.01); *F21V 11/16* (2013.01)

(58) Field of Classification Search
CPC ................................ B64D 47/06; F21V 11/16
USPC ......................................................... 362/470
See application file for complete search history.

(56) References Cited

U.S. PATENT DOCUMENTS

| 5,984,494 A | 11/1999 | Chapman et al. |
| 8,740,424 B2 | 6/2014 | Hessling et al. |
| 2003/0072165 A1 | 4/2003 | Schulz et al. |
| 2009/0015436 A1* | 1/2009 | Lundberg ............... B64D 39/00 340/945 |
| 2010/0277105 A1 | 11/2010 | Oyama |

FOREIGN PATENT DOCUMENTS

| CN | 102734689 B | 10/2012 |
| EP | 1710493 A2 | 10/2006 |
| EP | 2147863 A2 | 1/2010 |
| WO | 2002028711 A2 | 4/2002 |

OTHER PUBLICATIONS

EP SR dated Jul. 27, 2017 in, EP Application No. 16207530.3, 8 pages.

* cited by examiner

*Primary Examiner* — Anh T Mai
*Assistant Examiner* — Hana S Featherly
(74) *Attorney, Agent, or Firm* — Cantor Colburn LLP

(57) ABSTRACT

A dual mode light includes a housing, at least one first light emitter disposed in the housing, a plurality of second light emitters each disposed in the housing an emitter distance from the at least one first light emitter, a first shield disposed in the housing a first shield distance from the at least one first light emitter, wherein the first shield distance is less than the emitter distance, and a second shield disposed in the housing a second shield distance around the plurality of second light emitters.

19 Claims, 2 Drawing Sheets

DUAL MODE AFT LIGHT WITH A FIRST LIGHT EMITTER AND A PLURALITY OF SECOND LIGHT EMITTERS

This invention was made with government support with the United States Army under Contract No. W911W6-12-D-0006. The government therefore has certain rights in this invention.

BACKGROUND

The subject matter disclosed herein relates to lighting equipment, and more particularly, to lighting equipment for aircraft.

Aircraft lighting is utilized within an aircraft to provide visibility to other aircraft and flight control personnel. Aircraft lighting can utilize multiple lighting patterns to provide desired illumination and to comply with aviation requirements. Often, aircraft lighting may require multiple lighting sources or additional complexity to provide the required lighting patterns.

BRIEF SUMMARY

According to an embodiment, a dual mode light includes a housing, at least one first light emitter disposed in the housing, a plurality of second light emitters each disposed in the housing an emitter distance from the at least one first light emitter, a first shield disposed in the housing a first shield distance from the at least one first light emitter, wherein the first shield distance is less than the emitter distance, and a second shield disposed in the housing a second shield distance around the plurality of second light emitters.

According to an embodiment, an aircraft includes an aircraft body having an aft portion, and a dual mode light disposed on the aft portion of the aircraft body, the dual mode light including a housing, at least one first light emitter disposed in the housing, a plurality of second light emitters each disposed in the housing an emitter distance from the at least one first light emitter, a first shield disposed in the housing a first shield distance from the at least one first light emitter, wherein the first shield distance is less than the emitter distance, and a second shield disposed in the housing a second shield distance around the plurality of second light emitters.

Technical function of the embodiments described above includes at least one first light emitter disposed in the housing, a plurality of second light emitters each disposed in the housing an emitter distance from the at least one first light emitter, a first shield disposed in the housing a first shield distance from the at least one first light emitter, wherein the first shield distance is less than the emitter distance, and a second shield disposed in the housing a second shield distance around the plurality of second light emitters.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
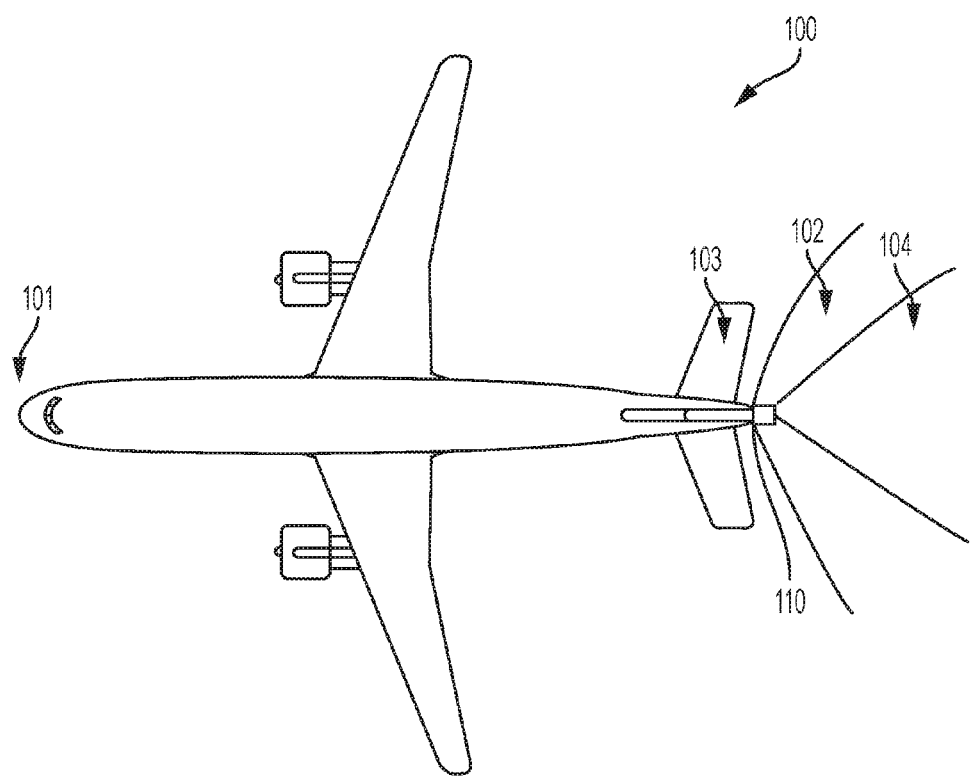
FIG. 1 is a schematic view of one embodiment of an aircraft.

Referring to the drawings, FIG. 1 shows an aircraft 100. In the illustrated embodiment, the aircraft 100 includes a fore portion 101, an aft portion 102, and at least one dual mode aft light 110. The aircraft 100 can be any suitable aircraft, including, but not limited to fixed wing aircraft 100, rotary wing aircraft, etc. In the illustrated embodiment, the aircraft 100 can utilize the dual mode aft light 110 to direct illumination where needed by regulations and operation requirements. In the illustrated embodiment, the dual mode aft light 110 can provide two modes of illumination, including a wide pattern 102 and a directional pattern 104. In the illustrated embodiment, the wide pattern 102 can be an omnidirectional pattern that is at least 70 degrees wide, while the directional pattern 104 is directed in a certain direction. Advantageously, the dual mode aft light 110 can provide both patterns 102, 104 without using multiple lights and while minimizing part count. This can reduce the amount of wiring and weight of the aircraft 100.

Figure 2:
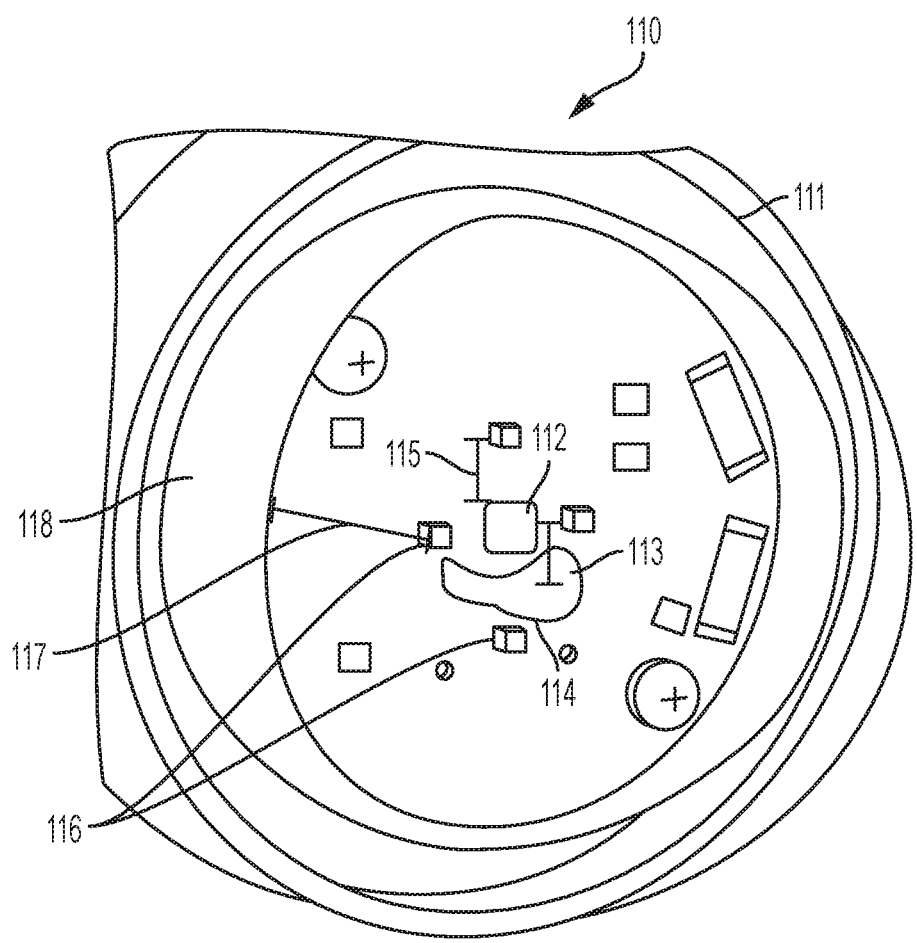
FIG. 2 is an isometric view of one embodiment of a dual mode aft light for use with the aircraft of FIG. 1.

Referring to FIG. 2, the dual mode aft light 110 is shown. In the illustrated embodiment, the dual mode aft light 110 includes a housing 111, an inner emitter 112, an inner shield 114, outer emitters 116, and an outer shield 118. In the illustrated embodiment, the dual mode aft light 110 can provide a directional light pattern from the inner emitter 112 and a wide light pattern from the outer emitter 116.

In the illustrated embodiment, the housing 111 can contain the inner emitter 112, an inner shield 114, outer emitters 116, and an outer shield 118 in a common housing 111. The housing 111 can be formed of plastic, aluminum or any other suitable material. The housing 111 can be a circular shape or any other suitable shape. The inner emitter 112 can be centered within the housing 111. Advantageously, the housing 111 contains both the inner emitter 112 and the outer emitters 116 to provide for dual mode operation.

In the illustrated embodiment, the inner emitter 112 is located within the housing 111. In certain embodiments, the inner emitter 112 is centered within the housing 111. The inner emitter 112 can be any suitable light source, including, but not limited to a light emitting diode. In the illustrated embodiment, the inner emitter 112 is a solid state emitter. In certain embodiments, the inner emitter 112 can provide a light source with a virtual optical center coincident with the virtual optical center as the outer emitter 116. Advantageously, the location of the inner emitter 112 allows for a minimal number of emitters while minimizing shadows and undesirable pattern characteristics.

In the illustrated embodiment, the inner shield 114 works in conjunction with the inner emitter 112 to provide a directional light pattern. In the illustrated embodiment, the inner shield 114 is a directional shield with geometric features to provide a sharp cutoff beyond the direction of the light pattern. In the illustrated embodiment, the inner shield 114 is disposed an inner shield distance 113 from the inner emitter 112. In certain embodiments, the inner shield distance 113 can range between 0.5 centimeters to 1.0 centimeters. In the illustrated embodiment, the inner shield 114 along with the inner emitter 112 is disposed within the outer emitters 116 to prevent or minimize negative light pattern effects of the outer emitters 116.

In the illustrated embodiment, the dual mode aft light 110 includes a plurality of outer emitters 116. In certain embodiments, the outer emitters 116 are light sources including, but not limited to, incandescent light sources, light emitted diodes, or any other suitable light sources. In the illustrated embodiment, the outer emitters 116 are radially disposed from the center of the dual mode aft light 110. In the illustrated embodiment, the outer emitters 116 are formed to create a virtual optical center that is coincident with the virtual optical center of the inner emitter 112.

In the illustrated embodiment, the outer emitters 116 can be disposed an outer emitter distance 115 from the center of the inner emitter 112. In certain embodiments, the outer emitter distance 115 is between 0.5 centimeters and 1 centimeter. In certain embodiments, the outer emitter distance 115 can be greater than 1 centimeter. In the illustrated embodiment, the outer emitters 116 are disposed radially outside of the inner shield 114 to minimize the light pattern created by the inner shield 114 during operation of the outer emitters 116. The outer emitter distance 115 allows the outer emitters 116 to "see around" the inner shield 114. Advantageously, the position of the outer emitters 116 eliminates or minimizes the need for a focusing optic, additional optical power, additional housings, additional components, etc., preventing additional complexity. Further, by positioning the outer emitters 116 outside of the inner shield 114 location, the outer emitters 116 are not required to be positioned in a precise manner.

In the illustrated embodiment, the light emitted from the outer emitters 116 is formed into the output pattern by the outer shield 118. The outer shield 118 is disposed an outer shield distance 117 from the outer emitters 116. In the illustrated embodiment, the outer shield distance 117 can be 3.5 centimeters to 4 centimeters from the outer emitters 116. In the illustrated embodiment, the outer shield 118 is disposed outside or around the plurality of outer emitters 116. In the illustrated embodiment, the outer shield 118 in conjunction with the outer emitters 116 can provide an omnidirectional light pattern of approximately 70 degrees. In other embodiments, the outer shield 118 in conjunction with the outer emitters 116 can provide an omnidirectional light pattern ranging between 60 to 80 degrees. Advantageously, the dual mode aft light 110 can provide the omnidirectional light pattern without requiring tight tolerances or additional equipment.

In the illustrated embodiment, the relationship between the inner shield distance 113 and the outer shield distance 117, along with the relationship between the inner emitter 112, the inner shield 114, the outer emitters 116, and the outer shield 118 allows the directional pattern created by the inner emitter 112 and the inner shield 114 to coexist with the omnidirectional pattern created by the outer emitters 116 and the outer shield 118 with minimal complication. In certain embodiments, the ratio between the inner shield distance 113 and the outer shield distance 117 is between 0.125 and 0.285. Advantageously, this ratio allows for both modes and output patterns to be contained in a single housing 111.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A dual mode light, comprising:
   a housing;
   at least one first light emitter disposed in the housing;
   a plurality of second light emitters each disposed in the housing an emitter distance from the at least one first light emitter;
   a first shield disposed in the housing to be separate from and at a first shield distance from the at least one first light emitter, wherein the first shield distance is less than the emitter distance; and
   a second shield disposed in the housing to be separate from and at a second shield distance around the plurality of second light emitters,
   wherein the first shield comprises central and end portions and the plurality of second light emitters is disposed to surround the first shield and comprises:
   a lower light emitter, which is disposed such that the central portion of the first shield is interposed between the lower light emitter and the at least one first light emitter; and
   a lateral light emitter, which is disposed such that no portion of the first shield is interposed between the lateral light emitter and the at least one first light emitter and such that the end portion of the first shield is interposed between the lateral light emitter and the lower light emitter.

2. The dual mode light of claim 1, wherein the first shield distance is between 0.5 centimeters and 1 centimeter.

3. The dual mode light of claim 1, wherein the second shield distance is between 3.5 entimeters and 4 centimeters.

4. The dual mode of light claim 1, wherein a distance ratio between the first shield distance and the second shield distance is between 0.125 and 0.285.

5. The dual mode light of claim 1, wherein the at least one first light emitter is a solid state emitter.

6. The dual mode light of claim 1, wherein the first shield is a directional shield and the second shield is an omnidirectional shield.

7. The dual mode light of claim 1, wherein the first shield is irregular in shape and the second shield is annular.

8. The dual mode light of claim 7, wherein the second shield has a 60 degree to 80 degree pattern.

9. The dual mode light of claim 1, wherein the at least one first light emitter and the plurality of second light emitters have a coincident virtual optical center.

10. An aircraft, comprising:
    an aircraft body having an aft portion; and
    a dual mode light disposed on the aft portion of the aircraft body, the dual mode light comprising:
    a housing;
    at least one first light emitter disposed in the housing;
    a plurality of second light emitters each disposed in the housing an emitter distance from the at least one first light emitter;
    a first shield disposed in the housing to be separate from and at a first shield distance from the at least one first light emitter, wherein the first shield distance is less than the emitter distance; and a second shield disposed in the housing to be separate from and at a second shield distance around the plurality of second light emitters, wherein the first shield comprises central and end portions and the plurality of second light emitters is disposed to surround the first shield and comprises:

a lower light emitter, which is disposed such that the central portion of the first shield is interposed between the lower light emitter and the at least one first light emitter; and a lateral light emitter, which is disposed such that no portion of the first shield is interposed between the lateral light emitter and the at least one first light emitter and such that the end portion of the first shield is interposed between the lateral light emitter and the lower light emitter.

11. The aircraft of claim 10, wherein the first shield distance is between 0.5 centimeters and 1 centimeter.

12. The aircraft of claim 10, wherein the second shield distance is between 3.5 centimeters and 4 centimeters.

13. The aircraft of claim 10, wherein a distance ratio between the first shield distance and the second shield distance is between 0.125 and 0.285.

14. The aircraft of claim 10, wherein the at least one first light emitter is a solid state emitter.

15. The aircraft of claim 10, wherein the first shield is a directional shield and the second shield is an omnidirectional shield.

16. The aircraft of claim 10, wherein the first shield is irregular in shape and the second shield is annular.

17. The aircraft of claim 16, wherein the second shield has a 60 degree to 80 degree pattern.

18. The aircraft of claim 10, wherein the at least one first light emitter and the plurality of second light emitters have a coincident virtual optical center.

19. A dual mode light, comprising:

a housing;

a first emitter disposed in the housing;

second emitters disposed in the housing an emitter distance from the first emitter;

a first shield disposed in the housing to be separate from and at a first shield distance from the first emitter, the first shield distance being less than the emitter distance; and a second shield disposed in the housing to be separate from and at a second shield distance around the second emitters, wherein the first shield comprises central and end portions and the second emitter surround the first shield and comprise:

a lower emitter disposed with the central portion of the first shield interposed between the lower emitter and the first emitter; and a lateral emitter disposed with no portion of the first shield interposed between the lateral emitter and the first emitter and with the end portion of the first shield interposed between the lateral emitter and the lower emitter.

* * * * *